United States Patent [19]

Yamada et al.

[11] Patent Number: 4,715,692
[45] Date of Patent: Dec. 29, 1987

[54] VARIFOCAL TYPE FINDER

[75] Inventors: Yasuyuki Yamada, Tokyo; Kazuo Fujibayashi, Kanagawa; Yasuhisa Sato, Kanagawa; Hideo Yokota, Kanagawa, all of Japan

[73] Assignee: Canon Kabushiki Kaisha, Tokyo, Japan

[21] Appl. No.: 653,966

[22] Filed: Sep. 24, 1984

[30] Foreign Application Priority Data

Sep. 28, 1983 [JP] Japan .......................... 58-149729[U]

[51] Int. Cl.⁴ ...................... G02B 15/02; G03B 13/10
[52] U.S. Cl. ............................. 350/422; 354/219; 354/222
[58] Field of Search ................ 350/422; 354/219, 222, 354/223

[56] References Cited

U.S. PATENT DOCUMENTS

| 4,256,396 | 3/1981 | Kawaguchi et al. | 350/422 |
| 4,478,493 | 10/1984 | Yokota | 354/222 |
| 4,591,234 | 5/1986 | Hamanishi | 350/422 |
| 4,595,270 | 6/1986 | Yamada et al. | 354/222 |

Primary Examiner—John K. Corbin
Assistant Examiner—Scott J. Sugarman
Attorney, Agent, or Firm—Toren, McGeady & Associates

[57] ABSTRACT

In the disclosed finder, an auxiliary lens for changing the magnification power is inserted into the space between an objective lens and an eyepiece. The size of the viewfield frame is simultaneously changed to maintain a constant percentage of the viewfield of the finder. The required rate of change of magnification power that the auxiliary lens must attain to leave the size of the viewfield frame of the finder unchanged can be reduced with the advantage of minimizing the bulk and size of the finder.

6 Claims, 6 Drawing Figures

FIG. I (a)
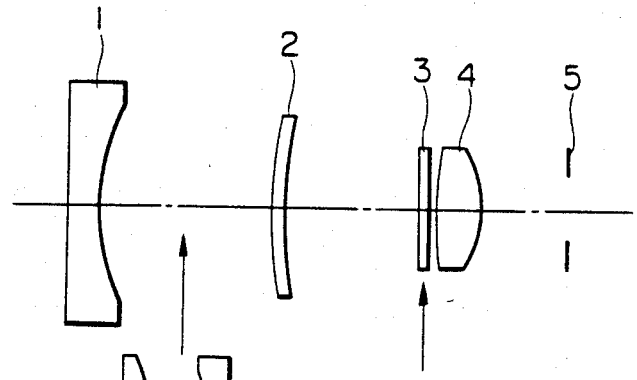
FIG. I (b)
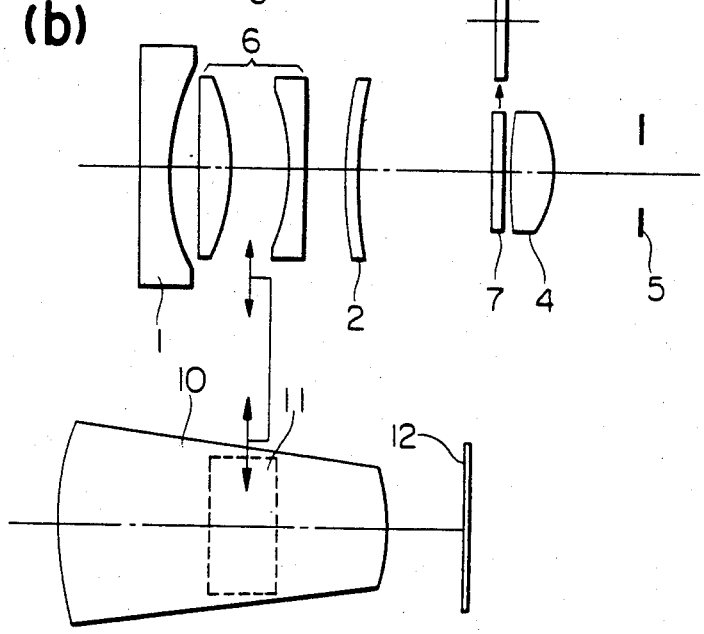

VARIFOCAL TYPE FINDER

BACKGROUND OF THE INVENTION

1. Field of the Invention

This invention relates to reverse-Galilean finders, and more particularly to reverse-Galilean finders capable of changing the magnification (magnifying power).

2. Description of the Prior Art

Previously known varifocal type reverse-Galilean finders are generally constructed with, from front to rear, a lens of positive refractive power and another lens of negative refractive power constituting an objective lens having a negative refractive power as a whole followed by an eyepiece of positive refractive power. When the lens of negative refractive power in the objective lens is interchanged by another lens of different negative refractive power, the magnification is changed.

In a varifocal type reverse-Galilean finder of such construction, however, when the same ratio of the magnification as that of change of the magnification of the photographic lens is given to the finder, the diameter of the objective lens of the finder becomes necessarily large. This is objectionable in cameras in which the size must be minimized.

An object of the present invention is to minimize the size of the variable magnification type finder.

Another object is to provide a reverse-Galilean finder comprising, from front to rear, an objective lens of negative refractive power and an eyepiece of positive refractive power, wherein the auxiliary lens has a refractive power which satisfies the following condition:

$$mF < mL$$

where mL is the ratio of change of the magnification of the photographic lens and mF is the ratio of change of the magnification of the finder. The auxiliary lens is attached in a space between the objective lens and the eyepiece, while the size of the viewfield frame of the finder is simultaneously changed so that the percentages of the visual field of the finder in the wide angle and telephoto positions are the same.

SUMMARY OF THE INVENTION

A finder of the variable magnification type includes an objective lens, an eyepiece arranged in a spaced relation to the objective lens, an auxiliary lens for magnification change to be inserted into and refracted from a space between the objective lens and the eyepiece, and means arranged in between the objective lens and the eyepiece to provide viewfield frames of different sizes when the auxiliary lens is inserted and retracted.

BRIEF DESCRIPTION OF THE DRAWINGS

FIGS. 1(a) and 1(b) are block diagrams of an embodiment of the varifocal type reverse-Galilean finder according to the present invention respectively in wide angle and telephoto positions.

Figures 2A, 2B:
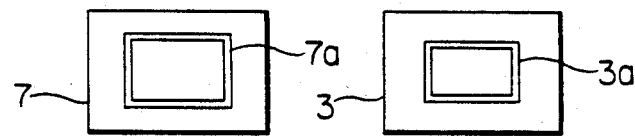
FIGS. 2(a) and 2(b) are plane views of the glass plates having viewfield frames of different sizes formed by vacuum deposition techniques and selectively used in the positions of FIGS. 1(a) and 1(b).

DETAILED DESCRIPTION OF THE PREFERRED EMBODIMENT:

The present invention will be described in connection with an embodiment thereof with reference to the accompanying drawings.

FIGS. 1(a) and 1(b) illustrate the construction and arrangement of the constituent elements of the varifocal type reverse-Galilean finder according to the present invention, with FIG. 1(a) in its wide angle position and FIG. 1(b) in the telephoto position.

A objective lens 1 has a negative refractive power; a reference numeral 2 identifies a view field frame image reflection mirror; a plain glass 3 has a viewfield frame vacuum-deposited thereon; reference numeral 4 identifies an eyepiece; 5 a pupil as imagined to be present; an auxiliary lens 6 is composed of elements of positive and negative refractive powers and is movable into and from an optical path of the finder; a plain glass 7 has a viewfield frame 7a of a size different from that of viewfield frame 3a on the plain glass 3 vacuum-deposited thereon and is interchangeable with the first plain glass 3, since the auxiliary lens 6 is inserted into the optical path. Also the viewfield frame 3a image reflection mirror 2 enables the observer to see the viewfield frame on the plane glass 3 through the eyepiece 4, and, meanwhile, because its central area is transparent, allows for observation of the scene. Reference numeral 10 identifies a photographic lens; an attachment lens 11 increases the magnification of the entire system; and reference numeral 12 identifies a photographic film.

In this construction and arrangement, the auxiliary lens 6, when in the wide angle position of FIG. 1(a), is retracted from the optical path of the finder. Then, when the photographic lens 10 is operated to change its magnification from the wide angle to the telephoto position, the auxiliary lens 6 is inserted into the space between the objective lens 1 and the eyepiece 4, whereby the magnification of the finder is changed to a ratio corresponding to the ratio of change of the magnification of the photographic lens 10.

It should be pointed out that letting mL denote the ratio of change of the magnification of the photographic lens 10 and mF the ratio of change of the magnification of the finder resulting from the insertion of the auxiliary lens 6, we have $$mF < mL$$

FIGS. 2(a) and 2(b) are respectively front views of the above-described plain glasses 3 and 7. The viewfield frame 7a of the plain glass 7 is larger in area size than the viewfield frame 3a of the plain glass 3 by the magnitude which the ratio of the magnification change of the photographic lens 10 is smaller than that of the magnification change of the finder. When the finder is in the wide angle position of FIG. 1(a), the plain glass 3 is inserted. But when in the telephoto position of FIG. 1(b), the plain glass 3 is replaced by the plain glass 7 to compensate for the difference between the ratios of magnification change of the photographic lens 10 and the finder, whereby the percentage of the visual field of the finder to the actual visual field of the photographic lens 10 is maintained constantly against the magnification change. Note, instead of using two interchangeable viewfield frame-equipped glass plates 3, 7 in selection, a liquid crystal display plate capable of selectively presenting two viewfield frames of different sizes may be used which are in fixedly secured relation to the finder housing.

Figure 3A:
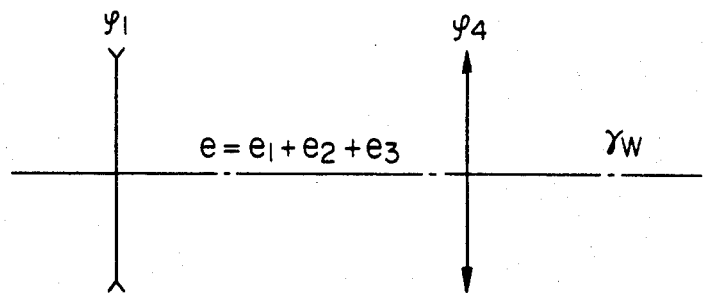
FIGS. 3(a) and 3(b) are schematic diagrams to explain the design of the finder in the positions of FIGS. 1(a) and 1(b).
Figure 3B:
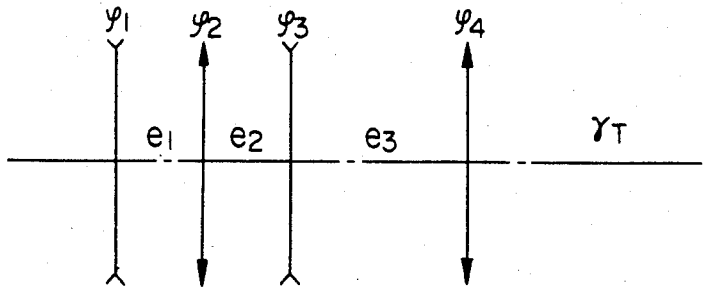

Here, referring further to FIGS. 3(a) and 3(b), let us consider an optimum finder design within the above-stated framework of construction and arrangement of the constituent elements. FIG. 3(a) illustrates the wide angle position of the finder, and FIG. 3(b) illustrates the telephoto position of the same finder.

In the wide angle position of FIG. 3(a), when the finder magnification $\gamma W$ and the principal point interval "e" (related to the thickness of the camera) are given, from equations:

$$\frac{\phi 4}{\phi 1} = -\gamma W, \quad \gamma W = 1 - e\phi 4 \qquad \text{I}$$

the values of $\phi 1$ and $\phi 4$ are obtained. Thus, a power distribution in the wide angle position is determined.

Next, the finder magnification $\gamma T$ in the telephoto position can be obtained from the following equations:

$$\frac{1 - e1\phi 1}{\phi 1 + \phi 2 - e1\phi 1\phi 2} + \frac{1 - e3\phi 4}{\phi 3 + \phi 4 - e3\phi 3\phi 4} = e2 \qquad \text{II}$$

$$\frac{\phi 3 + \phi 4 - e3\phi 3\phi 4}{\phi 1 + \phi 2 - e1\phi 1\phi 2} = -\gamma T$$

when $\phi 2$, $\phi 3$, e1 and e3 are given. But $\gamma T$ is initially given a value. In the case of the Albada finder, because of the necessity of putting the frame image reflection mirror 2 in the space between the $\phi 3$ and $\phi 4$, the e3 cannot be taken at a small value, and is usually given in the early stage of the design.

That is, to determine the power distribution in the telephoto position of FIG. 3(b), because the values of $\phi 1$, $\phi 4$, e3, $\gamma W$ and $\gamma T$ are already known, when the e2 is given a value, (therewith, from e=e1+e2+e3, the e1 is found), from equations I and II, the values of $\phi 2$ and $\phi 3$ are obtained.

From the foregoing, it is to be understood that for the thickness (related to the "e") of the camera, the finder magnification $\gamma W$ in the wide angle position, and the finder magnification $\gamma T$ in the telephoto position are given, the degree of freedom of the varifocal finder is only the principal point interval e2 between $\phi 2$ and $\phi 3$.

For example, for $\gamma W=0.5$, $\gamma T=0.8$, e=40, and e3=20, when e1=10 and e2=10, then $\phi 2=0.045$ and $\phi 3=-0.05$; when e1=15 and e2=5, then $\phi 2=0.082$ and $\phi 3=-0.11$. The smaller the value of e2, the stronger the refractive powers $\phi 2$ and $\phi 3$ become.

Hence, letting D denote the axial air separation between the objective lens 1 and the eyepiece 4, and "d" the axial air separation between the positive and negative elements in the auxiliary lens 6, it is desirable to satisfy the following condition:

$$0.1 < d/D < 0.5 \qquad \text{III}$$

When the lower limit is exceeded, the refractive powers of the positive and negative elements constituting the auxiliary lens 6 become too strong to prevent extreme deterioration of the visibility of the finder.

When the upper limit is exceeded, the auxiliary lens 6 mechanically interferes either with the objective lens 1 or with the frame reflection mirror 2.

Therefore, if it is found that the equalization of the ratio of change of the magnification the auxiliary lens 6 attributes to the finder with that of the magnification change of the photographic lens 10 violates the above inequalities III, the designer has to alter the scheme in such a way that as has been described above, the ratio of the magnification change is smaller than that of the magnification change of the photographic lens 10 so that the above-described auxiliary lens 6 can satisfy the inequalities III, while a decrease of the ratio of the magnification change of the finder is compensated for by increasing the size of the viewfield frame 3a, 7a as has been described above in order to insure that the viewfield percentage of the finder is always in the proper condition.

As has been described above, according to the present invention, it is possible to provide a very compact varifocal type reverse-Galilean finder while still preserving high optical performance. Therefore, it is extremely advantageous to cameras or the like which demand minimal bulk and size.

What is claimed is:

1. A finder of the variable magnification type comprising:
   an objective lens; an eyepiece arranged in a spaced relation to said objective lens; an auxiliary lens for magnification change arranged to be inserted into and retracted from a space between the objective lens and the eyepiece; and means arranged in between the objective lens and the eyepiece to provide viewfield frames of different sizes when the auxiliary lens is inserted and retracted.

2. A finder according to claim 1, wherein
   said providing means includes transparent plates having respective viewfield frames of different sizes written thereon and arranged to be interchangeable with each other in response to insertion and retraction of said auxiliary lens.

3. A finder according to claim 1, wherein
   said providing means includes a liquid crystal display plate for selectively displaying viewfield frames of different sizes in response to the insertion or retraction of said auxiliary lens.

4. A varifocal type reverse-Galilean finder comprising, from front to rear, an objective lens of negative refractive power, and an eyepiece of positive refractive power, wherein an auxiliary lens having a refractive power satisfying mF<mL where mL is the ratio of change of the magnification of a photographic lens and mF the ratio of change of the magnification of the finder is inserted into a space between said objective lens and said eyepiece, while the size of a viewfield frame of the finder is simultaneously changed so as to maintain substantially constant the percentage of the visual field of the finder between in the wide angle position and in the telephoto position.

5. A varifocal type reverse-Galilean finder according to claim 4, satisfying the following condition:

$$0.1 < d/D < 0.5$$

where D is the axial air separation between said objective lens and said eyepiece and "d" is the axial air separation between elements of positive and negative refractive powers in said auxiliary lens.

6. A finder of variable magnification type, comprising:
   objective lens means;
   an eyepiece arranged in a spaced relation to said objective lens means;

a first member which can be inserted into and removed out of a space between said objective lens means and said eyepiece for constituting a viewfield frame;

a second member which can be inserted into and removed out of a space between said objective lens means and said eyepiece for constituting another viewfield frame with a smaller size than that of said viewfield frame; and auxiliary lens means which can be inserted into and removed out of a space between said objective lens means and said eyepiece and has at least a positive lens and a negative lens for varying magnification, wherein said first member is inserted at a wide angle side and said auxiliary lens means and said second member are inserted at a telephoto side.

* * * * *